US007144626B2

(12) United States Patent
Akai et al.

(10) Patent No.: US 7,144,626 B2
(45) Date of Patent: Dec. 5, 2006

(54) MAGNETIC IRON OXIDE PARTICLES AND MAGNETIC TONER USING THE SAME

(75) Inventors: Hiroshi Akai, Aki-gun (JP); Koso Aoki, Hiroshima (JP); Hiromitsu Misawa, Hiroshima (JP); Naoki Uchida, Otake (JP); Ryo Iwai, Kure (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 11/097,377

(22) Filed: Apr. 4, 2005

(65) Prior Publication Data

US 2005/0227070 A1 Oct. 13, 2005

(30) Foreign Application Priority Data

Apr. 9, 2004 (JP) ............................ 2004-115883

(51) Int. Cl.
*B32B 5/16* (2006.01)
*B32B 9/00* (2006.01)
*B32B 15/02* (2006.01)
*B32B 17/02* (2006.01)
*B32B 19/00* (2006.01)

(52) U.S. Cl. .................. 428/402; 252/62.56; 428/702; 430/106.2; 430/111.41

(58) Field of Classification Search ................ 428/402, 428/702; 430/106.2, 111.41; 252/62.56
See application file for complete search history.

(56) References Cited

U.S. PATENT DOCUMENTS

| | | | | |
|---|---|---|---|---|
| 4,282,302 | A * | 8/1981 | Makino et al. | 430/106.2 |
| 5,652,060 | A * | 7/1997 | Uchida et al. | 428/404 |
| 6,465,144 | B1 * | 10/2002 | Hashimoto et al. | 430/106.1 |

FOREIGN PATENT DOCUMENTS

| | | |
|---|---|---|
| JP | 10-048878 | * 2/1998 |
| JP | 2005-320231 | * 11/2005 |

* cited by examiner

*Primary Examiner*—H. Thi Le
(74) *Attorney, Agent, or Firm*—Nixon & Vanderhye P.C.

(57) ABSTRACT

There are provided magnetic iron oxide particles having an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the secondary particles ($Da_{50}/Dp_{50}$) of 1.1 to 3.0, as well as a magnetic toner containing the magnetic iron oxide particles. The magnetic iron oxide particles of the present invention are in the form of small agglomerated particles and exhibit an excellent dispersibility, and the magnetic toner using the magnetic iron oxide particles is excellent in electrification stability.

5 Claims, No Drawings

MAGNETIC IRON OXIDE PARTICLES AND MAGNETIC TONER USING THE SAME

BACKGROUND OF THE INVENTION

The present invention relates to magnetic iron oxide particles and a magnetic toner using the magnetic iron oxide particles. More particularly, the present invention relates to magnetic iron oxide particles which can be present in the form of small agglomerated particles and have an excellent dispersibility, and a magnetic toner using the magnetic iron oxide particles.

As one of conventional electrostatic latent image-developing methods, there has been widely known and generally employed a so-called one component-system magnetic toner development method in which composite particles prepared by mixing and dispersing black magnetic iron oxide particles such as magnetite particles in a resin are used as a developer without a carrier.

With the recent tendency of high-speed copying and high-image quality for laser beam printers or digital copying machines, it has been strongly required to improve properties of a magnetic toner used as a developer therefor. For this purpose, the magnetic toner has been strongly required to exhibit an improved electrification performance.

The electrification performance of the magnetic toner has a close relationship with a dispersibility of the magnetic iron oxide particles contained therein. For this reason, the magnetic iron oxide particles have been strongly required to exhibit an excellent dispersibility.

That is, the magnetic toner has been produced by mixing magnetic particles in a resin, for example, an aromatic vinyl-based resin such as polymers composed of styrene and vinyl toluene, acrylic resins such as polymers composed of acrylic acid and methacrylic acid, and copolymer resins thereof. Therefore, the magnetic particles have been required to exhibit an excellent dispersibility in these resins.

The magnetic iron oxide particles having an excellent dispersibility mean particles which are excellent in easiness of dispersion in resins such that when the magnetic iron oxide particles are kneaded with the resins to obtain a resin molded product, agglomerated particles composed of the magnetic iron oxide particles can be deaggregated as fine as possible until being lowered in size into primary particles thereof or fine particles substantially identical to the primary particles thereof, or particles capable of completing such a kneading treatment for a short period of time.

However, the magnetic iron oxide particles are usually firmly agglomerated together to form hard large particles. For this reason, in the case where the resin molded product is produced by kneading the magnetic iron oxide particles with the resins, there tend to arise problems such as a prolonged dispersing time for deaggregating the agglomerated particles into individual small particles as well as increase in dispersing power of a kneader or a dispersing apparatus used therefor.

In addition, the magnetic iron oxide particles themselves tend to be magnetically agglomerated together due to fine particles. Therefore, when the magnetic iron oxide particles are kneaded with the resins upon production of a magnetic toner, it may be difficult to mix the magnetic iron oxide particles in the resins with a sufficient dispersibility. As a result, the magnetic iron oxide particles may fail to be dispersed in a state deaggregated into primary particles and, therefore, tend to be frequently still present in the form of the agglomerated particles.

In the case where a magnetic toner having a desired particle size is produced by pulverizing a kneaded material in which the magnetic iron oxide particles are not sufficiently dispersed, there tend to be caused problems such as liberation of magnetic particles from the agglomerated particles upon the pulverization as well as non-uniform content of the magnetic particles in individual magnetic toner particles, thereby failing to obtain a magnetic toner having an excellent electrification stability.

Conventionally, there have been conducted many attempts for improving a dispersibility of the magnetic iron oxide particles by pulverizing the particles using various pulverizers (Japanese Patent Application Laid-Open (KOKAI) Nos. 2-80(1990), 6-67453(1994), 8-259238(1996) and 2003-192351).

At present, it has been most strongly demanded to provide magnetic iron oxide particles for a magnetic toner which exhibit not only a good compatibility with resins used for the magnetic toner, in particular, aromatic vinyl-based resins, acrylic resins and copolymer resins thereof, but also a good dispersibility in these resins. However, such magnetic iron oxide particles fully satisfying these requirements have not been obtained until now.

That is, in Japanese Patent Application Laid-Open (KOKAI) No. 2-80(1990), there is described a method of pulverizing magnetic iron oxide particles using a Fred mill. However, in this method, the obtained magnetic iron oxide particles are still insufficient in dispersibility.

Also, in Japanese Patent Application Laid-Open (KOKAI) No. 6-67453(1994), there is described a method of pulverizing magnetic iron oxide particles using the combination of a wheel-type kneader and an impact-type pulverizer. However, in this method, the obtained magnetic iron oxide particles also are still insufficient in dispersibility.

Further, in Japanese Patent Application Laid-Open (KOKAI) No. 8-259238(1996), there is described a method of treating magnetic particles using a container-fixed horizontal double-axis type kneader to improve a dispersibility thereof. However, when aromatic vinyl-based resins, acrylic resins or copolymer resins of constituting monomers thereof are used as a resin for a magnetic toner, the magnetic particles fail to be sufficiently improved in dispersibility therein and, therefore, the magnetic toner produced therefrom is still insufficient in electrification stability.

In addition, in Japanese Patent Application Laid-Open (KOKAI) No. 2003-192351, there are described octahedral magnetic iron oxide particles having a number-average particle diameter of 0.2 to 1.0 μm as measured by a laser diffraction scattering-type particle size distribution method. However, since a ratio of the particle diameter as observed by SEM to the number-average particle diameter as measured by the laser diffraction scattering-type particle size distribution method is as large as not less than 3, agglomerated particles of the magnetic iron oxide particles have a too large particle size, so that the magnetic iron oxide particles fail to show an excellent dispersibility.

As a result of the present inventors' earnest studies, it has been found that by mixing an aqueous ferrous salt solution and an aqueous alkali hydroxide solution with each other for subjecting to the neutralization treatment, subjecting the mixed solution to oxidation treatment, and subjecting a slurry obtained after completion of the oxidation reaction to filtration and water-washing and then successively to wet-pulverization and drying in fluidized bed, the resultant magnetic iron oxide particles can be present in the form of small agglomerated particles (secondary particles), and can exhibit an excellent dispersibility. The present invention has been attained on the basis of this finding.

SUMMARY OF THE INVENTION

An object of the present invention is to provide magnetic iron oxide particles for a magnetic toner which can exhibit not only a good compatibility with aromatic vinyl-based resins, acrylic resins and copolymer resins thereof, but also a good dispersibility in these resins upon producing a magnetic toner using these resins, and have an excellent electrification stability.

To accomplish the aim, in a first aspect of the present invention, there is provided magnetic iron oxide particles having an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the primary particles ($Da_{50}/Dp_{50}$) of 1.1 to 3.0.

In a second aspect of the present invention, there is provided a process for producing magnetic iron oxide particles having an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the primary particles ($Da_{50}/Dp_{50}$) of 1.1 to 3.0, said process comprising:

mixing an aqueous ferrous salt solution and an aqueous alkali hydroxide solution with each other for subjecting to the neutralization treatment;

subjecting the mixed solution to oxidation treatment; and subjecting a slurry obtained after completion of the oxidation reaction to filtration and washing and then successively to wet pulverization and drying in fluidized bed.

In a third aspect of the present invention, there is provided a magnetic toner comprising magnetic iron oxide particles which have an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the primary particles ($Da_{50}/Dp_{50}$) of 1.1 to 3.0.

DETAILED DESCRIPTION OF THE INVENTION

Next, various conditions for carrying out the present invention are described.

The magnetic iron oxide particles of the present invention have an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the primary particles ($Da_{50}/Dp_{50}$) of 1.1 to 3.0.

The primary particles of the magnetic iron oxide particles according to the present invention have an average particle diameter ($Dp_{50}$) of 0.05 to 0.3 μm, preferably 0.10 to 0.25. When the average particle diameter ($Dp_{50}$) of the primary particles is less than 0.05 μm, the magnetic iron oxide particles tend to have a large coagulation force therebetween, resulting in poor dispersibility thereof. When the average particle diameter ($Dp_{50}$) of the primary particles is more than 0.5 μm, the magnetic iron oxide particles tend to be deteriorated in tinting strength and hiding power. Further, the number of the magnetic iron oxide particles contained in individual magnetic toner particles tends to be decreased, resulting in uneven distribution of the magnetic iron oxide particles in each magnetic toner particle. As a result, the resultant magnetic toner tends to be deteriorated in uniformity of electrification performance.

The secondary particles of the magnetic iron oxide particles according to the present invention have an average particle diameter ($Da_{50}$) of 0.055 to 0.9 μm, preferably 0.15 to 0.625. The secondary particles having an average particle diameter ($Da_{50}$) of less than 0.055 μm tend to be difficult to industrially produce. When the average particle diameter ($Da_{50}$) of the secondary particles is more than 0.9 μm, the particle diameter of the secondary particles (agglomerated particles) becomes large, resulting in poor dispersibility in the magnetic toner.

Meanwhile, in the present invention, a particle diameter of the secondary particles may be measured by a laser diffraction scattering-type particle size distribution method as described later, and the average particle diameter ($Da_{50}$) means a particle diameter corresponding to 50% of the whole particles in cumulative particle diameters based on the number thereof.

The ratio of the average particle diameter ($Da_{50}$) of the secondary particles to the average particle diameter ($Dp_{50}$) of the primary particles ($Da_{50}/Dp_{50}$) is in the range of 1.1 to 3.0, preferably 1.5 to 2.5. The particles having a ratio ($Da_{50}/Dp_{50}$) of less than 1.1 tend to be difficult to practically produce. When the ratio ($Da_{50}/Dp_{50}$) is more than 3.0, the particle diameter of the secondary particles (agglomerated particles) becomes large, resulting in poor dispersibility in the magnetic toner.

The particle shape of the primary particles of the magnetic iron oxide particles according to the present invention may be an isotropic shape such as an octahedral shape, a hexahedral shape, a granular shape and a spherical shape.

The magnetic iron oxide particles of the present invention are composed of magnetite particles having a composition represented by the formula: $(FeO)_x.Fe_2O_3$, wherein $0<x\leqq 1$, and may further contain, if required, at least one metal element other than iron selected from the group consisting of Si, Al, Mn, Ni, Zn, Cu, Mg, Co and Ti.

The magnetic iron oxide particles of the present invention have a BET specific surface area value of usually 5 to 15 $m^2/g$, preferably 6.0 to 12.0 $m^2/g$.

The magnetic iron oxide particles of the present invention have a coercive force of usually 2.39 to 15.92 kA/m (30 to 200 Oe), preferably 3.18 to 13.53 kA/m (40 to 170 Oe).

The magnetic iron oxide particles of the present invention have a saturation magnetization value of usually 81.0 to 90.0 $Am^2/kg$ (81.0 to 90.0 emu/g), preferably 84.0 to 90.0 $Am^2/kg$ (84.0 to 90.0 emu/g).

As described hereinafter, a surface roughness of a coating film containing the magnetic iron oxide particles of the present invention, which can be used as an index of a degree of dispersion of the magnetic iron oxide particles, is usually not more than 0.30 μm, preferably not more than 0.25 μm. When the surface roughness of the coating film is more than 0.30 μm, the particle diameter of the secondary particles (agglomerated particles) may become large, resulting in poor dispersibility thereof.

Next, the process for producing the magnetic iron oxide particles according to the present invention is described.

In the process for producing magnetic iron oxide particles, which comprises the steps of mixing an aqueous ferrous salt solution and an aqueous alkali hydroxide solution with each other for subjecting to the neutralization treatment, blowing an oxygen-containing gas, preferably air, through the resultant aqueous ferrous salt reaction solution containing a ferrous hydroxide colloid to oxidize ferrous ions contained therein, and then subjecting a slurry obtained after the oxidation reaction to filtration and washing, the washed slurry was further subjected to wet pulverization using a pulverizer such as a ball mill, attritor and a TK homomixer, and then to drying using a fluidized bed-type drying apparatus such as a spray dryer, thereby obtaining the magnetic iron oxide particles.

The amount of the aqueous alkali hydroxide solution used upon production of the ferrous hydroxide colloid may be controlled according to the aimed shape of the obtained iron oxide particles. More specifically, (1) in order to obtain spherical particles, the amount of the aqueous alkali hydroxide solution used is controlled such that the pH value of the ferrous hydroxide colloid is less than 8.0; (2) in order to obtain hexahedral particles, the amount of the aqueous alkali hydroxide solution used is controlled such that the pH value of the ferrous hydroxide colloid is in the range of 8.0 to 9.5; and (3) in order to obtain octahedral particles, the amount of the aqueous alkali hydroxide solution used is controlled such that the pH value of the ferrous hydroxide colloid is more than 9.5.

Examples of the aqueous ferrous salt solution used in the present invention may include an aqueous ferrous sulfate solution, an aqueous ferrous chloride solution, or the like.

Examples of the aqueous alkali hydroxide solution used in the present invention may include aqueous solutions of alkali metal hydroxides such as sodium hydroxide and potassium hydroxide, alkali earth metal hydroxides such as magnesium hydroxide and calcium hydroxide, or the like.

The oxidation reaction temperature used in the present invention is in the range of usually 80 to 100° C. When the oxidation reaction temperature is less than 80° C., acicular iron oxide hydroxide particles other than magnetite particles tend to be by-produced. When the oxidation reaction temperature is more than 100° C., although spherical magnetite particles can be produced, such a process is disadvantageous from the industrial viewpoints.

In the present invention, it is important that a slurry of the iron oxide particles which is produced by subjecting the slurry obtained after the oxidation reaction to filtration and washing, is further subjected to wet pulverization using a suitable pulverizer. Examples of the pulverizer used in the wet pulverization may include a ball mill, an attritor, a TK homomixer, or the like.

Upon the wet pulverization, it is required to apply a sufficient shear force to the magnetic particles contained in the slurry. For example, when the TK homomixer is used, the magnetic particles are treated at a rotating speed of usually not less than 2,000 rpm, preferably 4,000 to 10,000 rpm. When the ball mill or the attritor is used, the shear force applied to the magnetic particles upon dispersion thereof may vary depending upon a diameter of dispersing media used therein. Therefore, the diameter of the dispersing media used for dispersing the magnetic particles is preferably as small as possible. The diameter of the dispersing media is usually not more than 1 cm, preferably in the range of 1 to 5 mm. The treating time for the wet pulverization is usually not less than one hour, preferably in the range of 1 to 2 hours.

Next, it is important to dry the iron oxide particles obtained after subjecting to the wet pulverization using a fluidized bed-type drying apparatus. As the fluidized bed-type drying apparatus, there may be used a spray dryer or the like.

The dispersibility of the finally obtained magnetic iron oxide particles is influenced by a concentration of the slurry of the magnetic particles obtained after the wet pulverization which is subjected to drying in fluidized bed. In order to obtain the magnetic iron oxide particles having an excellent dispersibility, the slurry concentration is suitably as low as possible, and the concentration of the magnetic particles in the slurry is usually not more than 50%, preferably not more than 30%, more preferably 5 to 20%. The drying temperature in the fluidized bed is controlled such that the drying is completed only for a short period of time. Specifically, the drying temperature is usually not less than 100° C., preferably in the range of 150 to 250° C. The drying time is suitably as short as possible, and usually not more than 10 min, preferably 1 to 5 min.

As seen from the above, the magnetic iron oxide particles of the present invention can be produced by mixing the aqueous ferrous salt solution and the aqueous alkali hydroxide solution with each other for neutralization treatment thereof, subjecting the mixed solution to oxidation treatment, and then subjecting the slurry obtained after the oxidation reaction to filtration and washing and further successively to the combination of wet pulverization and drying in fluidized bed. When the washed slurry is subjected to only one of the wet pulverization and the drying in fluidized bed, the secondary particles tend to have a too large particle size, resulting in poor dispersibility in the magnetic toner.

Next, the magnetic toner containing the magnetic iron oxide particles according to the present invention is described.

The magnetic toner of the present invention can be produced by a known method of mixing and kneading a predetermined amount of a binder resin and a predetermined amount of the magnetic iron oxide particles with each other, and then pulverizing the resultant kneaded material into magnetic toner particles. More specifically, a mixture containing the magnetic iron oxide particles and the binder resin as well as, if required, mold release agents, colorants, charge controlling agents or other additives, is fully mixed together using a mixer, and then the magnetic iron oxide particles, etc., are dispersed in the binder resin using a heating kneader. Then, the resultant mixture is cooled and solidified to obtain a resin kneaded material, and the resin kneaded material is then pulverized and classified into a desired particle size, thereby obtaining the aimed magnetic toner.

Examples of the mixer may include a Henschel mixer, a ball mill or the like. Examples of the heating kneader may include a roll mill, a kneader, a twin-screw extruder, or the like. The pulverization may be conducted using a pulverizer such as a cutter mill and a jet mill, and the classification may be conducted by a known air classification method.

As an alternative method for producing the magnetic toner, there may be used a suspension polymerization method or an emulsion polymerization method. In the suspension polymerization method, a monomer composition prepared by dissolving or dispersing a mixture containing a polymerizable monomer and the magnetic iron oxide particles as well as, if required, colorants, polymerization initiators, crosslinking agents, charge controlling agents and other additives, is added to a water phase containing a suspension stabilizer under stirring to obtain a granulated product, and the resultant granulated product is polymerized, thereby obtaining a magnetic toner having a desired particle size.

In the emulsion polymerization method, a monomer and the magnetic iron oxide particles as well as, if required, colorants, polymerization initiators, etc., are dispersed in water, and then subjected to a polymerization process while adding an emulsifier thereto, thereby obtaining a magnetic toner having a desired particle size.

The point of the present invention is that since the magnetic iron oxide particles of the present invention have an average particle diameter ($Dp_{50}$) of primary particles of 0.05 to 0.3 μm, an average particle diameter ($Da_{50}$) of secondary particles of 0.055 to 0.9 μm, and a ratio of the average particle diameter ($Da_{50}$) of the secondary particles to the average particle diameter ($Dp_{50}$) of the primary particles ($Da_{50}/Dp_{50}$) of 1.1 to 3.0, the magnetic iron oxide particles can exhibit a good compatibility with resins used for toners, in particular, aromatic vinyl-based resins, acrylic resins and copolymer resins thereof, and a good dispersibility in these resins.

The reason why the magnetic iron oxide particles can exhibit these excellent properties is considered as follows. That is, since the magnetic iron oxide particles of the present invention are produced by mixing the aqueous ferrous salt solution and the aqueous alkali hydroxide solution with each other for neutralization treatment thereof; subjecting the mixed solution to oxidation treatment; and subjecting a slurry obtained after completion of the oxidation reaction to filtration and washing and then successively to wet pulverization and drying in fluidized bed, the secondary particles (agglomerated particles) thereof are in the form of small particles, and loosely agglomerated with each other, resulting in an excellent dispersibility of the resultant particles in resins for the magnetic toner.

The magnetic iron oxide particles of the present invention form small agglomerated particles and can exhibit an excellent dispersibility and, therefore, are suitable as magnetic particles for a magnetic toner.

Further, the magnetic toner using the magnetic iron oxide particles according to the present invention can exhibit an excellent electrification stability and, therefore, is suitable as a magnetic toner.

EXAMPLES

The present invention is described in more detail by Examples, but the Examples are only illustrative and, therefore, not intended to limit the scope of the present invention. Various properties described in the present invention were measured by the following methods.

(1) The average particle diameter ($Dp_{50}$) of primary particles of the magnetic iron oxide particles was determined from a Martin diameter (length of a line segment dividing a projected area into two halves in a predetermined direction) as one of projected diameters.

(2) The average particle diameter ($Da_{50}$) of secondary particles of the magnetic iron oxide particles was expressed by an average particle diameter based on the number thereof which was measured by adding the magnetic particles in a water medium to which sodium dodecylbenzensulfonate was added as a dispersant, and irradiating a supersonic wave to the resultant dispersion, using a laser diffraction scattering-type particle size distribution measuring apparatus "SALD-2000J" manufactured by Shimadzu Seisakusho Co., Ltd.

(3) The magnetic properties of the magnetic iron oxide particles were measured using a vibration sample magnetometer "VSM-3S-15" (manufactured by Toei Kogyo Co., Ltd.) by applying an external magnetic field of 796 kA/m thereto.

(4) The dispersibility of the magnetic iron oxide particles was represented by surface roughness Ra of a coating film, which was measured by the following method.

That is, 3 g of the magnetic iron oxide particles, 3 g of a styrene-acrylic copolymer resin, 10 g of toluene and 20 g of glass beads were weighed and placed in a 50 cc glass sampling bottle, and shaken and dispersed by a paint conditioner for 15 min to prepare a paste. The thus obtained paste was placed onto a PET film and applied thereto using a 6 mil-film applicator, and then dried to form a coating film. The surface roughness Ra of the resultant dry coating film was measured by a surface roughness/shape measuring apparatus "SURFCOM 570A" manufactured by Tokyo Seimitsu Co., Ltd.

(5) The degree of dispersion of the magnetic iron oxide particles in the magnetic toner was determined as follows.

That is, the magnetic toner was sliced using an ultramicrotome (tradename "MT2C" manufactured by RESEARCH MANUFACTURING Co., Ltd.), and the section of the sliced magnetic toner was observed by a transmission electron microscope (magnification: ×10,000 times) to examine an agglomerating condition of the magnetic iron oxide particles within a visual field. The results were classified into four ranks. The less the number of the agglomerated particles, the more excellent the dispersibility thereof.

| Dispersion degree | Number of agglomerated particles |
|---|---|
| A: | 0 to 1 agglomerated particle |
| B: | 2 to 5 agglomerated particles |
| C: | 6 to 10 agglomerated particles |
| D: | 11 or more agglomerated particles |

(6) The electrification stability of the magnetic iron oxide particles of the present invention was measured by the following method.

That is, 0.5 g of the magnetic toner and 9.5 g of iron particles as a carrier ("TEFV-200/300" produced by Powder-Tec Co., Ltd.) were accurately weighed and placed in a 15 cc glass sampling bottle, and frictionally electrified using a paint conditioner for 1 min and 30 min. The frictional charge amount generated was measured using a blow-off charge amount measuring apparatus manufactured by Toshiba Chemical Co., Ltd., and the results are classified into four ranks according to a rate of change in the frictional charge amount.

| Electrification stability | Change rate |
|---|---|
| A: | not more than 10% |
| B: | not more than 20% |
| C: | not more than 30% |
| D: | more than 30% |

Example 1

26.5 kg of an aqueous ferrous salt solution (concentration of $Fe^{2+}$: 1.7 mol/L; specific gravity: 1.25 g/cc; $Fe^{3+}/Fe^{2+}$: 0.8 mol %), 4.7 L of NaOH (18.5 N) and 19 L of water were reacted with each other to obtain an aqueous ferrous salt reaction solution containing a ferrous hydroxide colloid. It was confirmed that the ferrous hydroxide colloid had a pH value of 10.5. Next, air was blown into the reaction solution while maintaining the temperature of the solution at 90° C. to conduct an oxidation reaction thereof. After completion of the oxidation reaction, the resultant slurry was subjected to filtration and washing with water, and further subjected to wet pulverization using a ball mill (diameter of dispersing media: 2 mm) for 1 hour and then drying in fluidized bed (slurry concentration: 10%; drying temperature: 150° C.) using a spray dryer, thereby obtaining octahedral magnetic iron oxide particles. It was confirmed that 2.2 kg of magnetic iron oxide particles were obtained.

Examples 2 to 5

The same procedure as defined in Example 1 was conducted except that the particle shape and the diameter of primary particles of the magnetic iron oxide particles were variously changed, thereby obtaining magnetic iron oxide particles.

Various properties of the obtained magnetic iron oxide particles are shown in Table 1.

Comparative Examples 1 to 4

The oxidation reaction was conducted by the same method as defined in Example 1. In Comparative Example 1, after completion of the oxidation reaction, the resultant slurry was directly subjected to drying in fluidized bed without conducting the filtration, water-washing and wet pulverization. In Comparative Example 2, the resultant slurry was subjected to static drying after the wet pulverization. In Comparative Example 3, the resultant slurry was directly subjected to static drying without conducting the wet pulverization. In Comparative Example 4, both the wet pulverization and drying in fluidized bed were conducted, thereby obtaining magnetic iron oxide particles.

Various properties of the obtained magnetic iron oxide particles are shown in Table 1.

TABLE 1

| | Production process | | | |
|---|---|---|---|---|
| Examples and Comparative Examples | Wet pulverization | Drying method | Concentration of slurry (%) | Drying temperature (° C.) |
| Example 1 | Conducted | Fluidized bed | 10 | 150 |
| Example 2 | Conducted | Fluidized bed | 10 | 200 |
| Example 3 | Conducted | Fluidized bed | 10 | 200 |
| Example 4 | Conducted | Fluidized bed | 15 | 150 |
| Example 5 | Conducted | Fluidized bed | 15 | 200 |
| Comparative Example 1 | None | Fluidized bed | 10 | 150 |
| Comparative Example 2 | Conducted | Static | — | 60 |
| Comparative Example 3 | None | Static | — | 60 |
| Comparative Example 4 | Conducted | Fluidized bed | 10 | 150 |

TABLE 1-continued

| | Properties of magnetic iron oxide particles | | | |
|---|---|---|---|---|
| Examples and Comparative Examples | Shape | Average particle diameter of primary particles $Dp_{50}$ (μm) | Average particle diameter of secondary particles $Da_{50}$ (μm) | $Da_{50}/Dp_{50}$ |
| Example 1 | Octahedral | 0.20 | 0.38 | 1.90 |
| Example 2 | Octahedral | 0.25 | 0.40 | 1.60 |
| Example 3 | Octahedral | 0.12 | 0.29 | 2.42 |
| Example 4 | Hexahedral | 0.18 | 0.36 | 2.00 |
| Example 5 | Spherical | 0.15 | 0.33 | 2.20 |
| Comparative Example 1 | Octahedral | 0.20 | 0.64 | 3.20 |
| Comparative Example 2 | Octahedral | 0.20 | 0.62 | 3.10 |
| Comparative Example 3 | Octahedral | 0.20 | 0.67 | 3.35 |
| Comparative Example 4 | Octahedral | 0.04 | 0.13 | 3.25 |

| | Properties of magnetic iron oxide particles | | |
|---|---|---|---|
| Examples and Comparative Examples | Surface roughness Ra of coating film (μm) | Coercive force (kA/m) | Saturation magnetization value ($Am^2/kg$) |
| Example 1 | 0.18 | 10.82 (136 Oe) | 87.5 |
| Example 2 | 0.15 | 9.95 (125 Oe) | 88.1 |
| Example 3 | 0.20 | 12.65 (159 Oe) | 85.3 |
| Example 4 | 0.17 | 8.75 (110 Oe) | 86.5 |
| Example 5 | 0.18 | 7.16 (90 Oe) | 85.4 |
| Comparative Example 1 | 0.45 | 9.95 (125 Oe) | 87.6 |
| Comparative Example 2 | 0.42 | 10.35 (130 Oe) | 87.8 |
| Comparative Example 3 | 0.56 | 9.55 (120 Oe) | 87.5 |
| Comparative Example 4 | 0.40 | 13.55 (170 Oe) | 83.1 |

Example 6

<Production of Toner>

Using the magnetic iron oxide particles obtained in Example 1, the following components were mixed with each other at a mixing ratio shown below, and then melt-kneaded together using a twin-screw extrusion kneader (tradename "S-1" manufactured by Kurimoto Tekkosha Co., Ltd.). The resultant kneaded material was cooled, and subjected to coarse pulverization and then fine pulverization. Further, the obtained particles were classified, thereby obtaining a magnetic toner having a volume-average particle diameter of 9.7 μm (as measured by an apparatus (tradename "Multisizer II" manufactured by Coulter Counter Co., Ltd.). Then, 0.5 part by weight of hydrophobic silica fine particles (tradename "RX-200" produced by Nippon Aerogel Co., Ltd.) was externally added to 100 parts by weight of the thus obtained magnetic toner, thereby obtaining a magnetic toner.

| | |
|---|---|
| Styrene-acrylic copolymer resin | 100 parts by weight |
| Magnetic iron oxide particles | 90 parts by weight |
| Negative charge controlling agent | 1 part by weight |
| Low-molecular weight wax | 5 parts by weight |

Examples 7 to 10 and Comparative Examples 5 to 8

The same procedure as defined in Example 6 was conducted except that the kind of magnetic iron oxide particles was variously changed, thereby obtaining a magnetic toner.

Various properties of the thus obtained magnetic toner were shown in Table 2.

TABLE 2

| Examples and Comparative Examples | Kind of magnetic iron oxide particles used | Properties of toner: Degree of dispersion of magnetic iron oxide particles in toner | Properties of toner: Electrification stability |
|---|---|---|---|
| Example 6 | Example 1 | A | A |
| Example 7 | Example 2 | A | B |
| Example 8 | Example 3 | B | B |
| Example 9 | Example 4 | A | A |
| Example 10 | Example 5 | B | A |
| Comparative Example 5 | Comparative Example 1 | D | D |
| Comparative Example 6 | Comparative Example 2 | C | C |
| Comparative Example 7 | Comparative Example 3 | D | D |
| Comparative Example 8 | Comparative Example 4 | C | C |

What is claimed is:

1. Magnetic iron oxide particles having an average particle diameter ($Dp_{50}$) of primary particles of 0.05 to 0.3 μm, an average particle diameter ($Da_{50}$) of secondary particles of 0.055 to 0.9 μm, a ratio of the average particle diameter ($Da_{50}$) of the secondary particles to the average particle diameter ($Dp_{50}$) of the primary particles ($Da_{50}/Dp_{50}$) of 1.1 to 3.0 and as an index of a degree of dispersion of said magnetic iron oxide particles, a surface roughness of not more than 0.30 μm.

2. Magnetic iron oxide particles according to claim 1, wherein said primary particles have an average particle diameter ($Dp_{50}$) of 0.10 to 0.25 μm, said secondary particles have an average particle diameter ($Da_{50}$) of 0.15 to 0.625 μm, and said ratio of the average particle diameter ($Da_{50}$) of the secondary particles to the average particle diameter ($Dp_{50}$) of the primary particles ($Da_{50}/Dp_{50}$) is 1.5 to 2.5.

3. Magnetic iron oxide particles according to claim 1, wherein said magnetic iron oxide particles have a BET specific surface area value of 5 to 15 $m^2/g$, a coercive force of 2.39 to 15.92 kA/m, and a saturation magnetization value of 81.0 to 90.0 $Am^2/kg$.

4. A process for producing the magnetic iron oxide particles as defined in claim 1, compnsing:

mixing an aqueous ferrous salt solution and an aqueous alkali hydroxide solution with each other for subjecting to the neutralization treatment thereof;

subjecting the mixed solution to oxidation treatment; and subjecting a slurry obtained after completion of the oxidation reaction to filtration and water-washing and then successively to wet-pulverization and drying in fluidized bed.

5. A magnetic toner containing the magnetic iron oxide particles as defined in claim 1.

* * * * *